(12) United States Patent
Heim et al.

(10) Patent No.: US 11,358,805 B2
(45) Date of Patent: Jun. 14, 2022

(54) FLEXIBLE HOPPER FOR A CONVEYOR SYSTEM

(71) Applicant: Caterpillar Paving Products Inc., Brooklyn Park, MN (US)

(72) Inventors: Daniel Heim, Blaine, MN (US); Colton Hirman, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 206 days.

(21) Appl. No.: 16/775,785

(22) Filed: Jan. 29, 2020

(65) Prior Publication Data

US 2020/0165072 A1   May 28, 2020

Related U.S. Application Data

(60) Division of application No. 16/424,141, filed on May 28, 2019, now Pat. No. 10,583,995, which is a continuation-in-part of application No. 16/018,634, filed on Jun. 26, 2018, now Pat. No. 10,589,933.

(51) Int. Cl.
| | |
|---|---|
| *B65G 67/12* | (2006.01) |
| *B65G 47/18* | (2006.01) |
| *E01C 23/12* | (2006.01) |
| *B65G 47/74* | (2006.01) |
| *B65G 47/44* | (2006.01) |
| *B65G 47/52* | (2006.01) |
| *B65G 67/08* | (2006.01) |

(52) U.S. Cl.
CPC ............. *B65G 47/18* (2013.01); *B65G 47/44* (2013.01); *B65G 47/52* (2013.01); *B65G 47/74* (2013.01); *E01C 23/12* (2013.01); *B65G 67/08* (2013.01)

(58) Field of Classification Search
CPC ....... B65G 67/08; B65G 67/22; E01C 23/122; E01C 23/124; E01C 23/125; E01C 23/127
USPC ..................................... 198/314; 404/90, 91
See application file for complete search history.

(56) References Cited

U.S. PATENT DOCUMENTS

| | | | | |
|---|---|---|---|---|
| 3,035,682 A | * | 5/1962 | Ferch .................... | B65G 11/106 198/550.1 |
| 3,061,282 A | * | 10/1962 | Hilkemeier ........... | B28C 5/4237 366/44 |
| 3,163,280 A | * | 12/1964 | Haugland .............. | B65G 67/24 193/25 R |
| 3,168,946 A | | 2/1965 | Gay | |
| 3,590,983 A | * | 7/1971 | Oury ....................... | E04G 21/04 198/530 |

(Continued)

FOREIGN PATENT DOCUMENTS

| | | |
|---|---|---|
| CA | 2768953 A1 | 8/2013 |
| EP | 0336815 A1 | 10/1989 |
| WO | 2010045952 A1 | 4/2010 |

*Primary Examiner* — Joseph A Dillon, Jr.
(74) *Attorney, Agent, or Firm* — Harrity & Harrity LLP (57) ABSTRACT

Some examples described herein include a flexible hopper for a conveyor system. The flexible hopper may include a hopper weldment attached to a frame of the conveyor, wherein the hopper weldment surrounds a charge end of the conveyor, a flexible connector that is attached to the hopper weldment and configured to enable an opening of the flexible hopper to expand or contract, and a flexible skirt that is folded over the flexible connector. The flexible skirt may include a plurality of flexible strips configured to form an enclosure between the flexible connector and the hopper weldment.

14 Claims, 7 Drawing Sheets

(56) References Cited

U.S. PATENT DOCUMENTS

| | | | |
|---|---|---|---|
| 3,738,464 A | 6/1973 | Ortlip et al. | |
| 4,139,318 A * | 2/1979 | Jakob | E01C 23/088 |
| | | | 37/219 |
| 4,361,079 A | 11/1982 | Christensen et al. | |
| 4,478,548 A * | 10/1984 | Heimes | A01D 90/105 |
| | | | 414/502 |
| 4,610,344 A | 9/1986 | Eastman | |
| 4,741,687 A | 5/1988 | Eltvedt | |
| 4,778,031 A | 10/1988 | Curiel | |
| 5,277,538 A | 1/1994 | Theurer et al. | |
| 5,722,790 A | 3/1998 | Spray | |
| 5,740,903 A * | 4/1998 | Epp | B65G 33/24 |
| | | | 198/588 |
| 5,788,055 A * | 8/1998 | Stewart | B65G 33/32 |
| | | | 414/505 |
| 5,820,773 A | 10/1998 | Hintzman et al. | |
| 6,845,859 B2 * | 1/2005 | Grundl | E01C 19/48 |
| | | | 198/588 |
| 7,237,753 B2 | 7/2007 | Metcalfe | |
| 7,540,687 B2 | 6/2009 | Neumann | |
| 8,485,336 B2 | 7/2013 | Tenold et al. | |
| 8,752,694 B2 | 6/2014 | Putman | |
| 9,708,779 B2 | 7/2017 | Brown | |
| 9,957,108 B2 | 5/2018 | Ho et al. | |
| 10,005,622 B1 | 6/2018 | Narsingh | |
| 10,106,333 B2 * | 10/2018 | Beaujot | B65G 65/34 |
| 10,227,740 B2 * | 3/2019 | Verhaelen | E01C 23/088 |
| 2004/0143928 A1 * | 7/2004 | Engel | E01H 1/042 |
| | | | 15/340.1 |
| 2004/0221562 A1 * | 11/2004 | Snider | A01D 57/26 |
| | | | 56/16.4 R |
| 2005/0217976 A1 | 10/2005 | Hall | |
| 2008/0014032 A1 | 1/2008 | Rillmann | |
| 2009/0139828 A1 | 6/2009 | Burstrom et al. | |
| 2009/0152073 A1 | 6/2009 | Fischer et al. | |
| 2011/0272510 A1 * | 11/2011 | Ragnarsson | B02C 21/026 |
| | | | 241/101.2 |
| 2012/0145608 A1 * | 6/2012 | Garland | B07B 11/06 |
| | | | 209/245 |
| 2014/0183003 A1 | 7/2014 | Jorgensen et al. | |
| 2016/0167819 A1 * | 6/2016 | Nakai | B02C 1/00 |
| | | | 241/266 |
| 2016/0236231 A1 | 8/2016 | Chastine et al. | |
| 2016/0264366 A1 | 9/2016 | Heitplatz | |
| 2017/0009409 A1 | 1/2017 | Verhaelen et al. | |
| 2019/0003133 A1 | 1/2019 | Tkachenko et al. | |
| 2019/0086026 A1 * | 3/2019 | Hirman | E01C 23/127 |
| 2019/0135553 A1 | 5/2019 | Hirman | |
| 2019/0299242 A1 * | 10/2019 | Chastine | F27D 27/005 |
| 2019/0389660 A1 | 12/2019 | Hirman et al. | |
| 2021/0131047 A1 * | 5/2021 | Hirman | E01C 23/127 |
| 2021/0198853 A1 * | 7/2021 | Winkels | E01C 23/088 |
| 2021/0339962 A1 * | 11/2021 | Weiler | B65G 67/24 |
| 2022/0042257 A1 * | 2/2022 | Schaaf | B65G 11/146 |

\* cited by examiner

FLEXIBLE HOPPER FOR A CONVEYOR SYSTEM

RELATED APPLICATIONS

This application is a divisional of U.S. patent application Ser. No. 16/424,141, filed on May 28, 2019, which is a continuation-in-part (CIP) of U.S. patent application Ser. No. 16/018,634, filed on Jun. 26, 2018, the contents of which are incorporated by reference herein in their entirety.

TECHNICAL FIELD

The present disclosure relates generally to transfer of material using conveyors and, more particularly, to a flexible hopper for a conveyor system.

BACKGROUND

Asphalt-surfaced roadways are built to facilitate vehicular travel. Depending upon usage density, base conditions, temperature variation, moisture levels, and/or physical age, the surfaces of the roadways eventually become misshapen and unable to support wheel loads. In order to rehabilitate the roadways for continued vehicular use, spent asphalt is removed in preparation for resurfacing.

Cold planers, sometimes also called road mills or scarifiers, are used to break up and remove layers of an asphalt roadway. A cold planer typically includes a frame propelled by tracked or wheeled drive units. The frame supports an engine, an operator station, a milling drum, and conveyors. The milling drum, fitted with cutting tools, is rotated through a suitable interface with the engine to break up the surface of the roadway. The broken-up roadway material is deposited by the milling drum onto a first conveyor that transfers the broken-up roadway material from a discharge end of the first conveyor to a charge end of a second conveyor. The second conveyor may deposit the broken-up roadway material the from a discharge end of the second conveyor toward a direction of travel (e.g., that is parallel to the first conveyor and/or second conveyor) of the cold planer. The second conveyor may be configured to pivot about the charge end of the second conveyor to enable the second conveyor to deposit the broken-up roadway material from the cold planer at an angle that is not parallel to the first conveyor. During operation, however, when the broken-up roadway material is transferred from the first conveyor to the second conveyor, some of the broken-up roadway material may not reach the second conveyor due to mis-alignment of the charge end of the second conveyor and the discharge end of the first conveyor and/or due to the amount of material that is grouped together and/or transferred at one moment. As such, broken-up roadway material that does not reach the second conveyor may be deposited within the cold planer, on the remaining roadway, or the like.

One attempt to transfer milled material is described in U.S. Patent Application Publication No. 2017/0009409 to Verhaelen et al. and was published on Jan. 12, 2017 ("the Verhaelen reference"). In particular, the Verhaelen reference describes a milling machine with a transfer element arranged to receive milled-off material from a first conveyor that includes a transfer opening essentially coaxial to a vertical pivoting axis and opening downwardly. The Verhaelen reference further describes a reception element arranged at a second conveyor and that includes an upwardly open reception opening and a lid element at least a major part of the reception opening. In the Verhaelen reference, the lid element includes a passage opening configured to allow communication of the transfer opening with the reception opening.

While the transfer element, reception element, and lid element of the Verhaelen reference may enable material to be deposited from the second conveying device and/or the first conveying device, the transfer housing does not resolve certain issues with range of movement of the second conveying device relative to the first conveying device and/or varying amounts of material being transferred from the first conveying device to the second conveying device.

The flexible hopper of the present disclosure solves one or more of the problems set forth above and/or other problems in the art.

SUMMARY

According to some implementations, a cold planer may include a frame; at least one traction device configured to support the frame; an engine supported by the frame and configured to drive the at least one traction device to propel the cold planer; a milling drum; a first conveyor comprising a first charge end, configured to receive material removed by the milling drum, and a first discharge end; a second conveyor comprising a second charge end and a second discharge end; and a flexible hopper fixed to the second charge end of the second conveyor and configured to receive material from the first discharge end of the first conveyor. The flexible hopper may include a flexible connector and a flexible skirt that includes a plurality of flexible strips folded over the flexible connector, wherein at least a portion of each of the plurality of flexible strips is configured to overlap a portion of another strip of the plurality of flexible strips to form an enclosure between the first discharge and the second discharge.

According to some implementations, a conveyor system may include a first conveyor to convey material from a first charge end to a first discharge end; a second conveyor to convey material from a second charge end to a second discharge end; and a flexible hopper configured to receive material from the first discharge end. The flexible hopper may be attached to the second charge end of the second conveyor and include a hopper weldment that surrounds the second charge end, a flexible connector that includes an elastic tensioning member that is attached to the hopper weldment; and a flexible skirt that is bundled by the flexible connector, the flexible skirt comprising a plurality of overlapping flexible strips folded over the flexible connector to enable an enclosure to be formed between the first discharge end and the second charge end.

According to some implementations, a flexible hopper may be configured to receive material that is to be conveyed on a conveyor. The flexible hopper may include a hopper weldment attached to a frame of the conveyor, wherein the hopper weldment surrounds a charge end of the conveyor; a flexible connector that is attached to the hopper weldment and configured to enable an opening of the flexible hopper to expand or contract; and a flexible skirt that is folded over the flexible connector, the flexible skirt comprising a plurality of flexible strips configured to form an enclosure between the flexible connector and the hopper weldment.

DETAILED DESCRIPTION

A cold planer may refer to a machine used to remove material, such as hardened asphalt, from a ground surface, such as a roadway. A conveyor system may transfer the material from the ground surface to a haul vehicle (e.g., a wagon or tractor trailer). The conveyor system may include multiple conveyors that transfer material to one another. The conveyors may be aligned with one another to enable the material to be deposited in a direction of travel of the cold planer and/or transverse to one another to enable the material to be deposited transverse to a direction of travel of the cold planer. During operation of the cold planer, a first conveyor and a second conveyor of the conveyor system of the cold planer may move independently from one another. For example, a position of the first conveyor can change relative to a position of the second conveyor (and vice versa) (e.g., based on pivoting one or both of the conveyors, rotating one or both of the conveyors, lifting one or both of the conveyors, lowering one or both of the conveyors, and/or the like). Some implementations described herein assist with ensuring that varying amounts of the material, when transferred from the first conveyor to the second conveyor, are captured and transferred to the second conveyor to enable the second conveyor to remove the material from the cold planer. Furthermore, some implementations described herein may be applied to any conveyor system that receives any type of material at a first location and conveys that material to a second location.

Figure 1:
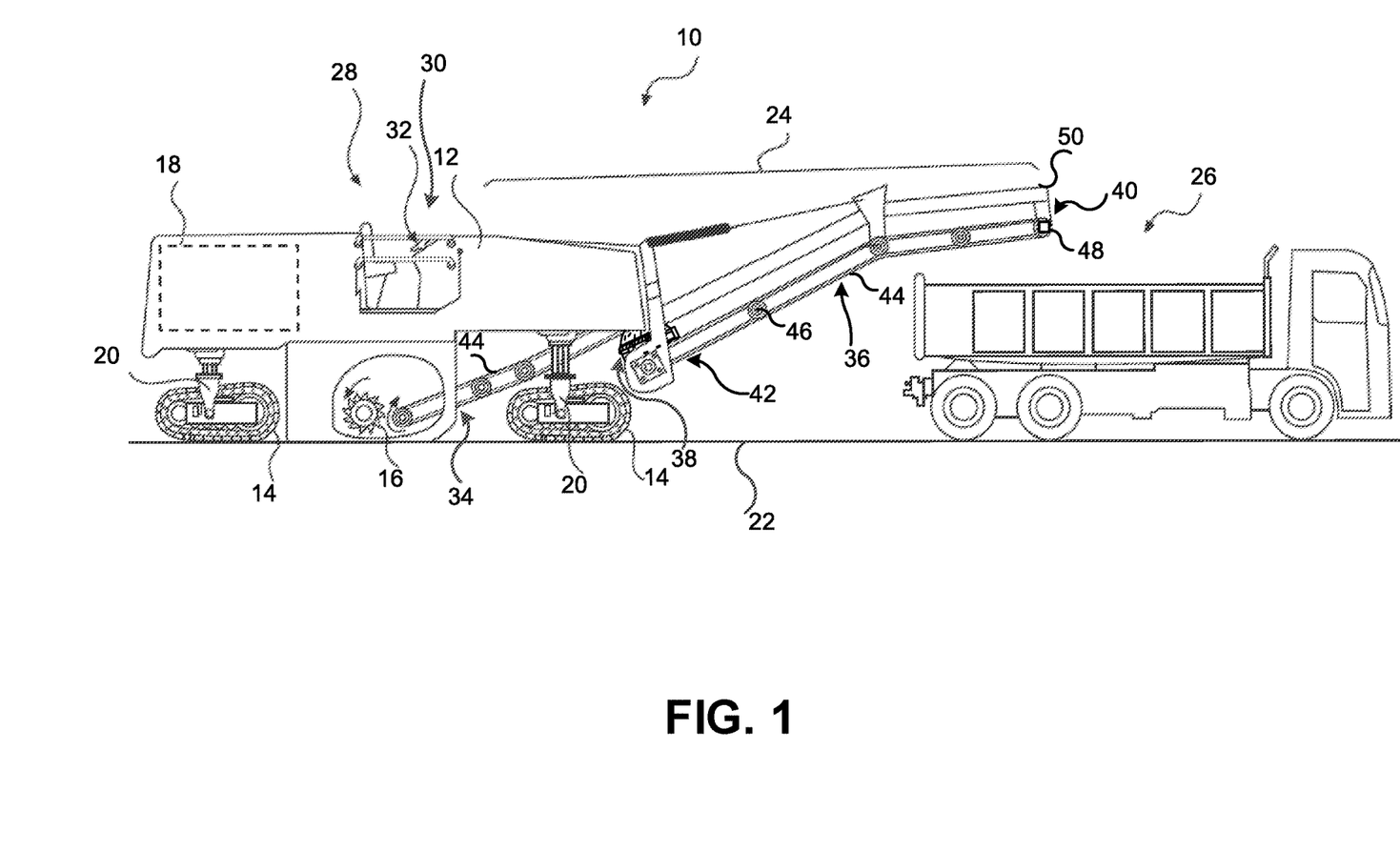
FIG. 1 is a diagram of an example cold planer.

FIG. 1 is a diagram of an example cold planer 10 having a frame 12 supported by one or more traction devices 14, a milling drum 16 rotationally supported under a belly of frame 12, and an engine 18 mounted to frame 12 and configured to drive traction devices 14 and milling drum 16. Traction devices 14 may include either wheels or tracks connected to actuators 20 that are adapted to controllably raise and lower frame 12 relative to a ground surface. Raising and lowering of frame 12 may function to vary a milling depth of milling drum 16 into a work surface 22. In some implementations, the same or different actuators 20 may be used to steer cold planer 10 and/or to adjust a travel speed of traction devices 14 (e.g., to speed up or brake traction devices 14). A conveyor system 24 may be connected at a leading end to frame 12 and configured to transport material away from milling drum 16 and into a receptacle, such as a waiting haul vehicle 26.

Frame 12 may support an operator station 28. Operator station 28 may be located at a side of cold planer 10 opposite milling drum 16. Additionally, or alternatively, operator station 28 may be located offboard cold planer 10. For example, operator station 28 may include a remote control, such as a handheld controller, that an operator may use to control cold planer 10 from anywhere on a worksite. Additionally, or alternatively, operator station 28 may include a combination of hardware and software, such as a software program executing on a computer or a processor. In some implementations, cold planer 10 may be an autonomous vehicle and may not include operator station 28. Operator station 28 may house a control console 30 with any number of interface devices 32 used to control cold planer 10.

Conveyor system 24 may include a first conveyor 34 adjacent milling drum 16. First conveyor 34 is configured to receive milled material from milling drum 16 at a charge end of first conveyor 34, and to provide, at a discharge end of first conveyor 34, the milled material to a second conveyor 36. Second conveyor 36 may receive the milled material via a flexible hopper 38 of second conveyor 36, positioned below first conveyor 34, and may dispense the milled material into haul vehicle 26 at an elevated discharge end 40 of second conveyor 36. Flexible hopper 38 may be connected to (e.g., fixed to, attached to, fastened to, formed as a part of, adhered to, or the like) second conveyor 36 at a charge end 42 of second conveyor 36. Flexible hopper 38 may include one or more flexible supports, a skirt, a hopper weldment, or the like to receive the milled material and may be able to expand or contract as necessary for the amount of material being transferred and/or expand or contract as necessary according to the configuration of first conveyor 34 relative to second conveyor 36. In some implementations, charge end 42 may be configured in a position below a discharge end of first conveyor 34, such that material transferred from the discharge end of first conveyor 34 falls into flexible hopper 38 and charge end 42 of second conveyer 36.

Second conveyor 36 may be rotatably attached to frame 12 at charge end 42 so that second conveyor 36 can vertically rotate, and a height at which milled material leaves second conveyor 36 at discharge end 40 may be adjusted. Additionally, or alternatively, second conveyor 36 may be rotatably attached to frame 12 at charge end 42, so that second conveyor 36 can horizontally rotate, so that a direction at which milled material leaves second conveyor 36 may be adjusted relative to a direction of travel of cold planer 10 or first conveyor 34.

As shown in FIG. 1, first conveyor 34 and second conveyor 36 may each include a belt 44 that is supported by one or more roller assemblies 46 and driven by a motor 48 (only one motor 48 is shown in FIG. 1). Motor 48 may include, for example, a hydraulic motor, an electric motor, or the like. Second conveyor 36 may include a cover 50 to prevent debris from falling and/or accumulating on belt 44 or other components of second conveyor 36.

As indicated above, FIG. 1 is provided as an example. Other examples may differ from what is described in connection with FIG. 1. For example, while conveyor system 24 is described herein as working with cold planer 10, conveyor system 24 may work with another type of machine and/or may work separately from a machine.

Figure 2:
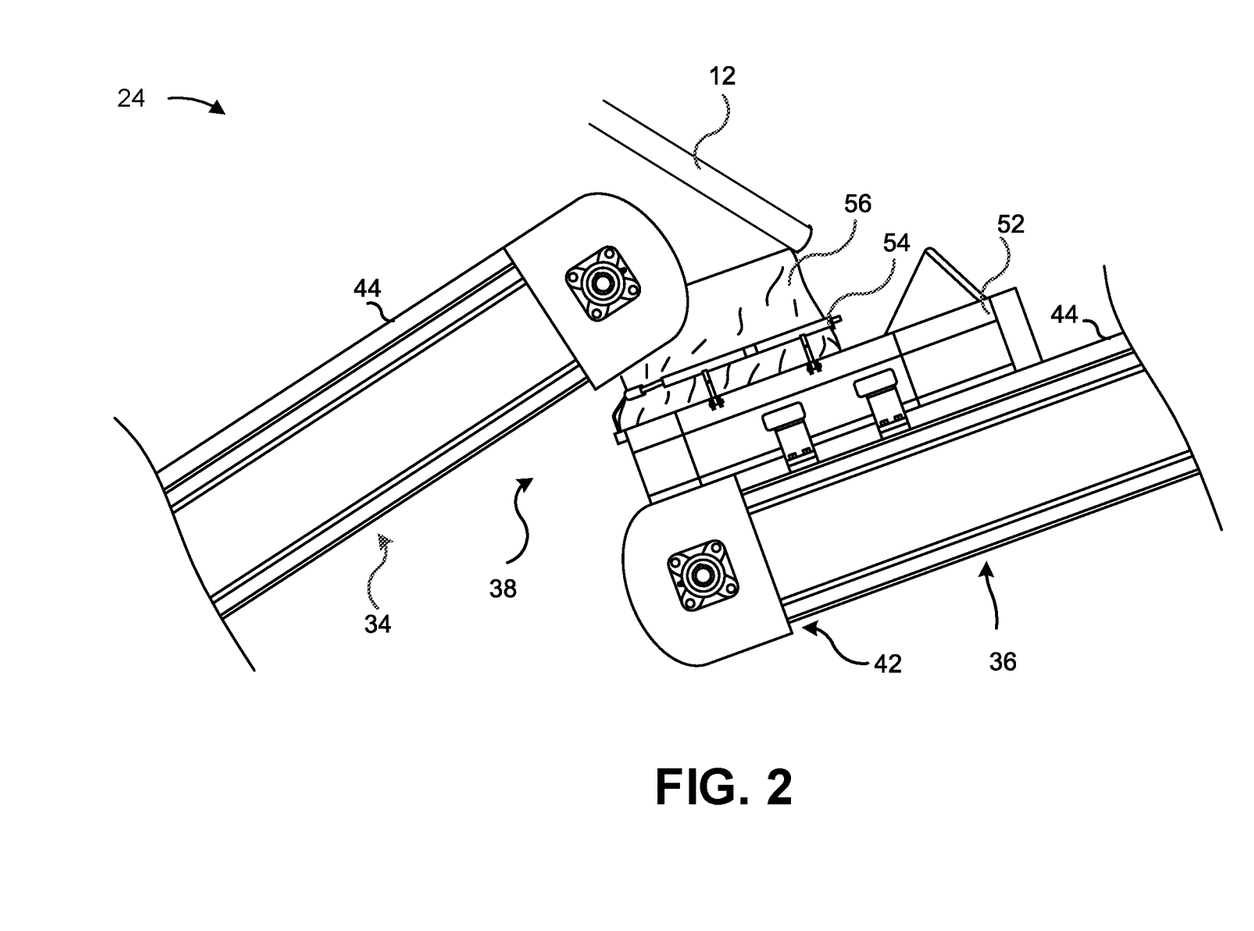
FIG. 2 is a diagram of an example conveyor system that may be used with the cold planer of FIG. 1.

FIG. 2 is a diagram of an example conveyor system 24 that may be used with cold planer 10 of FIG. 1. As shown in FIG. 2, conveyor system 24 includes flexible hopper 38 at a charge end 42 of second conveyor 36. Flexible hopper 38 includes a hopper weldment 52, a flexible frame 54, and a skirt 56 (e.g., a flexible skirt). Flexible hopper 38 is configured to expand and/or contract via the flexible frame 54 based on movement of second conveyor 36 relative to first conveyor 34 (or vice versa) and/or based on movement of second conveyor 36 relative to a direction of travel of a machine implementing conveyor system 24 (e.g., cold planer 10 of FIG. 1).

Hopper weldment 52 includes any type of support structure configured to support flexible frame 54. In some implementations, hopper weldment 52 may include one or more surfaces configured to funnel material transferred from first conveyor 34 to second conveyor 36. For example, hopper weldment 52 may include one or more plates that are to be attached to skirt 56 (e.g., via one or more bolts, via an adhesive, or the like), such that milled material that is transferred through skirt 56 is transferred to second conveyor 36. Hopper weldment 52 may be U-shaped (e.g., according to a design of flexible frame 54), such that hopper weldment 52 surrounds charge end 42 of second conveyor 36. As such, hopper weldment 52 may be configured to prevent material from falling from charge end 42 of second conveyor 36.

Flexible frame 54 includes any type of flexible structure configured to support and/or attach to skirt 56. Flexible frame 54 may include one or more rigid pieces that are connected to one another via one or more flexible pieces. For example, flexible frame 54 may include one or more brackets that can be flexed or bent via one or more hinges. Additionally, or alternatively, flexible frame 54 may include one or more rigid structures (e.g., tubes or tube-like structures formed from a non-malleable metal or plastic material) with a flexible support strung through the rigid structures, as described herein. The flexible support may include and/or be attached to flexible frame 54 and/or hopper weldment 52 via an elastic tensioning member, such as a bungee cord, a cable and spring combination, a torsional spring and hinge combination, and/or the like. Accordingly, flexible frame 54 may be configured to contract or expand based on a configuration of conveyor system 24 (e.g., a position of second conveyor 36 relative to first conveyor 34) and/or based on an amount of material transferring through skirt 56.

In some implementations, flexible frame 54 may include only a flexible support wrapped around and/or connected to skirt 56. For example, flexible frame 54 may include an elastic tensioning member woven (or interlaced) through holes of skirt 56 to cause skirt 56 to contract or expand based on a configuration of conveyor system 24 or based on an amount of milled material transferring through skirt 56.

Skirt 56 may include any flexible material that is capable of being fixed to hopper weldment 52, flexible frame 54, and/or frame 12 (e.g., a frame 12 of cold planer 10). For example, skirt 56 may include one or more sheets of rubber that are fixed together (e.g., sewn together, bolted together, or the like). Skirt 56 may be configured as a tube or sleeve, through which milled material is to transfer from first conveyor 34 to second conveyor 36. Skirt 56 may be configured to keep a particular shape or form an enclosure based on a configuration of flexible frame 54 and/or based on how skirt 56 is attached to flexible frame 54. For example, flexible frame 54 may ensure that skirt 56 cannot reach a closed position such that milled material is not capable of transferring through skirt 56.

Skirt 56 may be formed from a plurality of flexible strips, as described below (e.g., in connection with FIGS. 6 and 7). For example, the flexible strips may be folded around flexible frame 54, may be folded around a flexible support or flexible connector (e.g., a single tensioning member), and/or may overlap one another to substantially form an enclosure between the discharge end of first conveyor 34 and charge end 42 of second conveyor 36. The flexible strips may be rubber strips that have a particular durometer and/or level of rigidity to form an enclosure between flexible frame 54 (and/or flexible support or flexible connector described herein) and hopper weldment 52. In such cases, a curtain may extend from the discharge end of first conveyor 34 into an opening of skirt 56 (e.g., if skirt 56 is not attached to a frame or support toward the discharge end of first conveyor 34), which may correspond to an opening of flexible hopper 38.

Skirt 56 may be configured to form an enclosure between a discharge end of first conveyor 34 and charge end 42 of second conveyor 36 of FIG. 2. For example, a first end of skirt 56 may be attached to hopper weldment 52 and a second end of skirt 56 may be configured to open toward first conveyor 34. Skirt 56 may be attached to frame 12 and/or first conveyor 34. Skirt 56 may be flexible in that skirt 56 is able to move and flex by virtue of flexible frame 54. Accordingly, skirt 56 can accommodate material flowing from first conveyor 34 to second conveyor 36 and maintain an enclosure between the discharge end of first conveyor 34 and charge end 42 of second conveyor 36. For example, the enclosure may be formed such that any opening(s) in the enclosure formed between first conveyor 34 and second conveyor 36 may be smaller than pieces of the material being transferred from first conveyor 34 to second conveyor 36.

Accordingly, during operation, conveyor system 24, with flexible hopper 38, enables milled material to be transferred from first conveyor 34 to second conveyor 36. Flexible hopper 38 is capable of changing shape according to a configuration of conveyor system 24 and/or the amount of milled material that is being transferred from first conveyor 34 to second conveyor 36 at a particular moment. Such flexibility may prevent material from escaping conveyor system 24.

As indicated above, FIG. 2 is provided as an example. Other examples may differ from what is described in connection with FIG. 2. In some implementations, conveyor system 24 may include additional components, fewer components, different components, or differently arranged components than those shown in FIG. 2.

Figure 3:
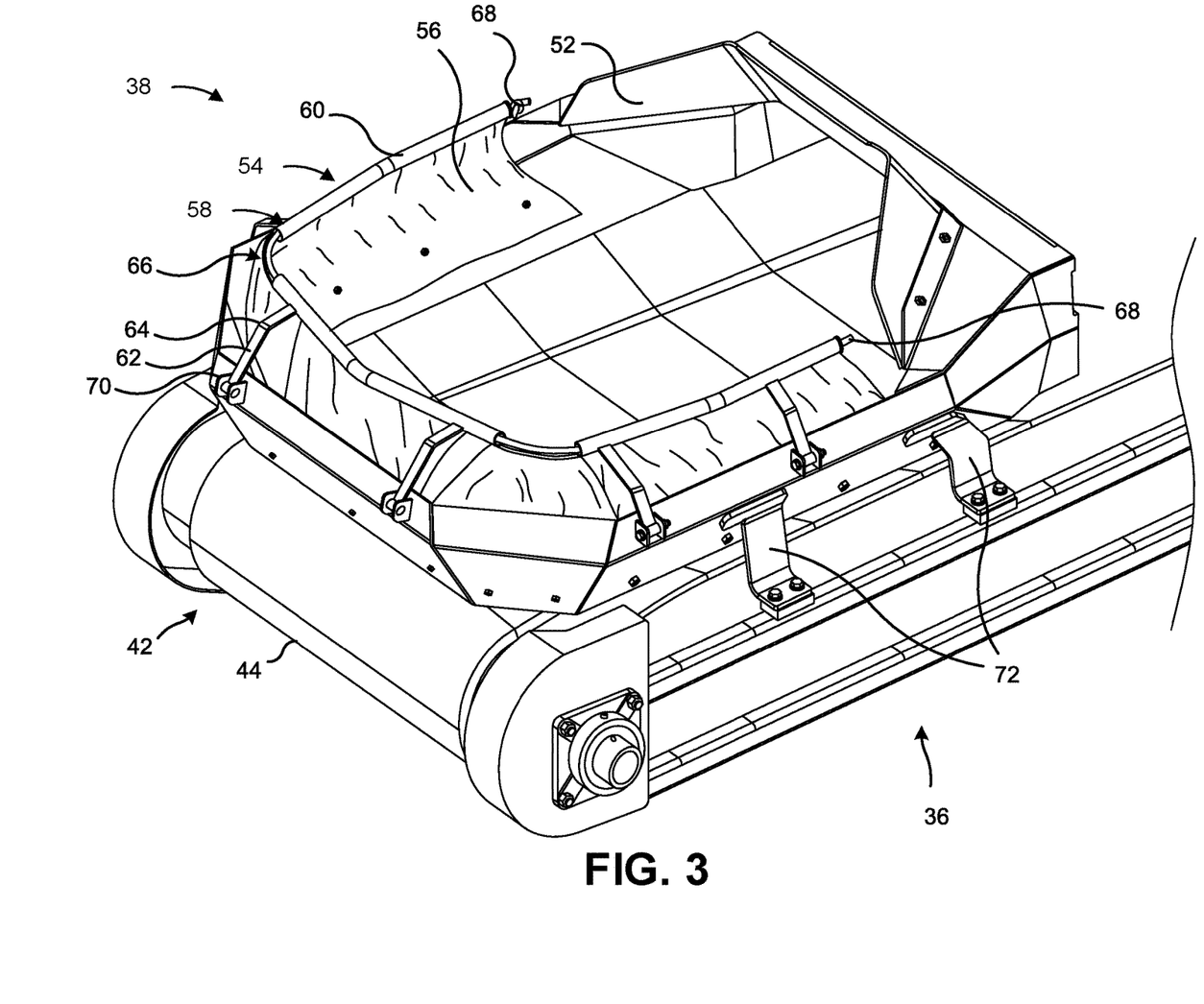
FIG. 3 is an isometric view of an example flexible hopper that may be used in the example conveyor system of FIG. 2.

FIG. 3 is an isometric view of an example flexible hopper 38 that may be used in conveyor system 24 of FIG. 2. As shown in FIG. 3, flexible hopper 38 includes hopper weldment 52, flexible frame 54, and skirt 56 at a charge end 42 of second conveyor 36. Flexible frame 54 is configured to expand or contract via a flexible support 58 with a plurality of frame supports 60 (referred to individually as "frame support 60" or collectively as "frame supports 60") and a plurality of brackets 62 (referred to individually as "bracket 62" or collectively as "brackets 62") with one or more hinges 64 (referred to individually as "hinge 64" or collectively as "hinges 64"). According to some implementations, the flexible support 58 may expand or contract within the frame supports 60 and the hinges 64 of brackets 62 may adjust a configuration of the brackets 62 based on movement of second conveyor 36 and/or based on an amount of material being received by flexible hopper 38. For example, due to skirt 56 being attached to hopper weldment 52 and flexible frame 54, when second conveyor 36 moves, forces applied to skirt 56 from hopper weldment 52 may cause flexible support 58 to expand or contract in one or more locations. As such, due to a rotation of second conveyor 36 about charge end 42, flexible support 58 may expand or contract, causing flexible frame 54 to expand or contract.

As shown in FIG. 3, flexible support 58 includes frame supports 60 and one or more flexible connectors 66 (referred to individually as "flexible connector 66" or collectively as "flexible connectors 66") that are capable of adjusting a size and/or opening of flexible support 58 to enable the shape of flexible frame 54 to be flexible and/or one or more dimensions of flexible frame 54 to be adjustable. Frame supports 60 may be rigid in that frame supports 60 are designed to not be flexible. Frame supports 60 may include one or more rigid metal structures, rigid plastic structures, or the like. Flexible support 58 may include a single flexible connector 66 (e.g., a single elastic tensioning member) that stretches through frame supports 60 to each flexible support end 68. In such cases, frame supports 60 may be tubular (e.g., hollow with one or more openings), so that flexible support 58 can pass or be run through each frame support 60. Additionally, or alternatively, flexible support 58 may include a plurality of flexible connectors 66 that connect at least two frame supports 60 together to form flexible support 58. In such a case, frame supports 60 may or may not be tubular.

As shown in FIG. 3, flexible support 58 is U-shaped, such that flexible support ends 68 are separated from one another. Flexible support 58, may be continuous, such that there are no flexible support ends 68 and the one or more flexible connectors 66 that form flexible support 58 form an enclosed shape (e.g., a circle, oval, rectangle, or the like).

As further shown in FIG. 3, brackets 62 include hinges 64, such that each bracket 62 is a hinged bracket. Accordingly, flexible support 58 may include a plurality of hinged brackets. Brackets 62 connect to frame supports 60 at a first end of the brackets and hopper weldment 52 via bracket connectors 70 at a second end of the brackets. Bracket connectors 70 may enable brackets 62 to pivot relative to hopper weldment 52. Although FIG. 3 shows each bracket 62 with one hinge 64, brackets 62 may include more than one hinge 64 or brackets 62 may not include hinges 64. Hinges 64 enable a configuration of brackets 62 to be adjusted, such that an angle between legs of brackets 62 can be increased or decreased based on flexible support 58 (and/or flexible connector 66) moving, expanding, and/or contracting.

In the example of FIG. 3, hopper weldment 52 is attached to second conveyor 36 via hopper brackets 72. Hopper brackets 72 may be attached to second conveyor 36 and configured such that hopper weldment 52, and correspondingly flexible hopper 38, are at charge end 42 of second conveyor 36.

As indicated above, FIG. 3 is provided as an example. Other examples may differ from what is described in connection with FIG. 3. In some implementations, conveyor system 24 may include additional components, fewer components, different components, or differently arranged components than those shown in FIG. 3. For example, flexible support 58 may not include frame supports 60 or brackets 62. In such a case, flexible support 58 may include one or more elastic tensioning members that are wrapped around and/or woven through openings in skirt 56 (e.g., a configuration of openings or holes in skirt 56 configured to receive flexible support 58). Furthermore, the size (e.g., the width) of flexible hopper 38 relative to the size (e.g., the width) of second conveyor 36 is provided as an example. In practice, the size (e.g., the width) of flexible hopper 38 may be bigger than, the same as, or smaller than the size (e.g., the width) of second conveyor 36.

Figure 4:
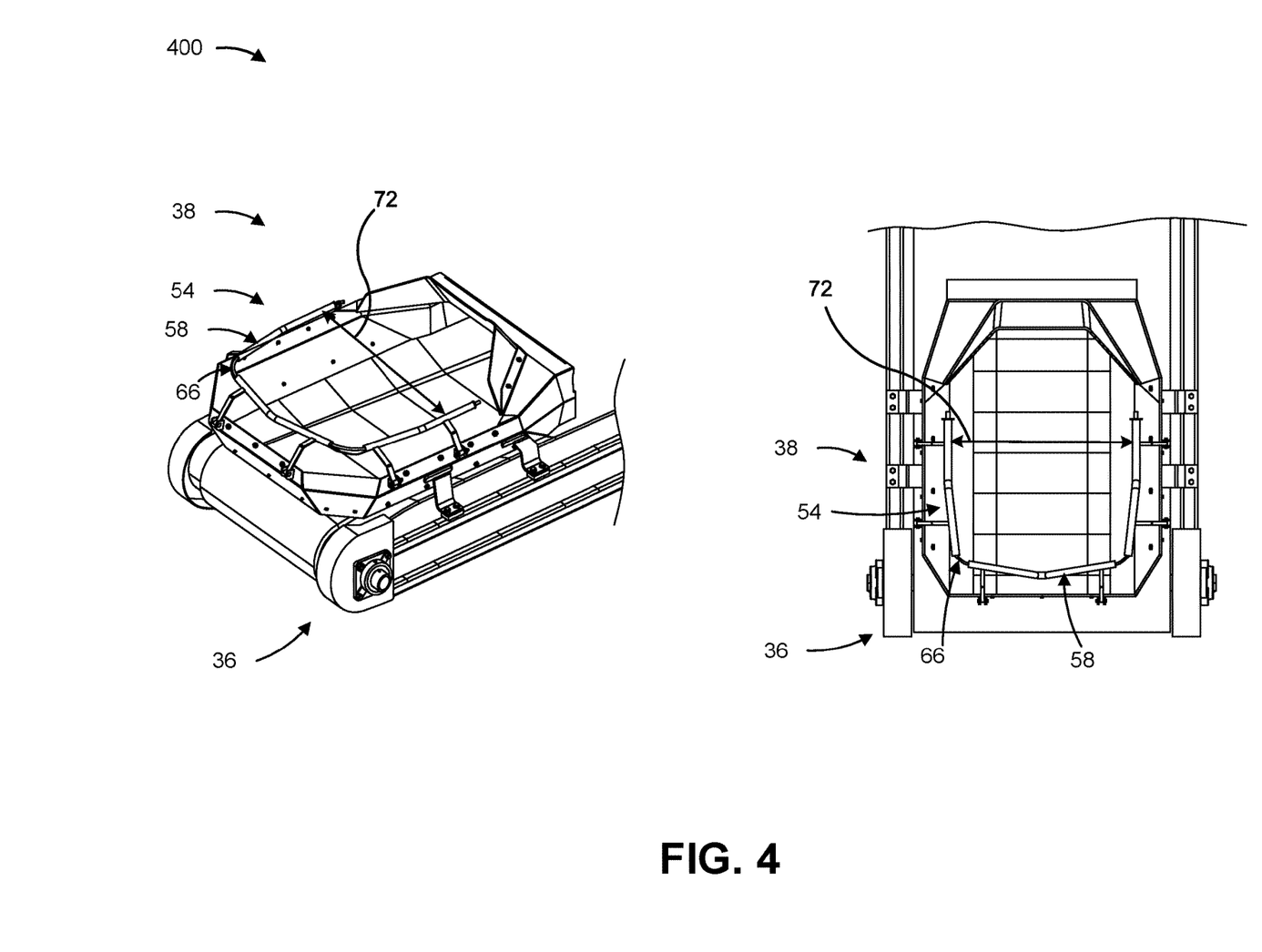
FIG. 4 is an isometric view and a top view of an example implementation of a flexible frame of the example flexible hopper of FIG. 3 in a contracted position.

FIG. 4 is an isometric view and a top view of an example implementation 400 of a flexible frame 54 of the example flexible hopper 38 of FIG. 3 in a contracted position. As shown in FIG. 4, flexible frame 54 is in a contracted position as a frame opening 72 has a minimum width (e.g., a minimum width according to a design of flexible frame 54). Example implementation 400 may show flexible hopper 38 at rest (e.g., while flexible hopper 38 is not receiving material). Accordingly, flexible support 58 and/or flexible connector 66 may be in a contracted position according to properties of flexible connector 66.

In some implementations, flexible frame 54, when in the contracted position, may have a relatively uniform (or symmetrical) shape. Flexible frame 54 may be in the contracted position when material is not being received by flexible hopper 38 (e.g., material is not being transferred through skirt 56). Additionally, or alternatively, flexible frame 54 may be in the contracted position when second conveyor 36 is aligned with first conveyor 34, such that the material conveys in a same direction on the other conveyor as the material conveys on second conveyor 36 (e.g., relative to a configuration of conveyor system 24).

As indicated above, FIG. 4 is provided as an example. Other examples may differ from what is described in connection with FIG. 4.

Figure 5:
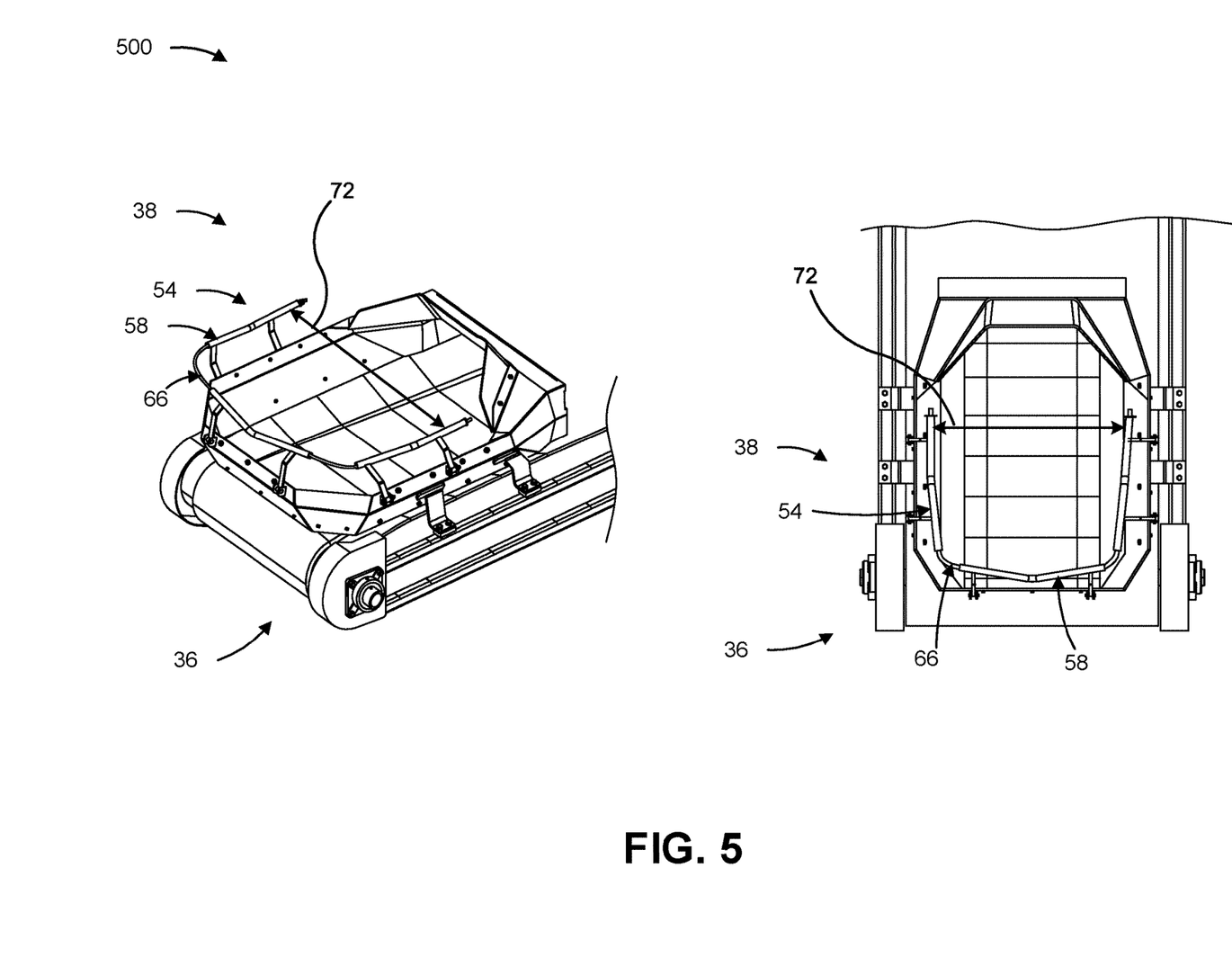
FIG. 5 is an isometric view and a top view of an example implementation of a flexible frame of the example flexible hopper of FIG. 3 in an expanded position.

FIG. 5 is an isometric view and a top view of an example implementation 500 of a flexible frame 54 of the example flexible hopper 38 of FIG. 3 in an expanded position. As shown in FIG. 5, flexible frame 54 is in expanded position as a frame opening 72 has a wider width that the width of example implementation 400 of FIG. 4. Example implementation 500 may show flexible hopper 38 during operation.

In the example of FIG. 5, flexible frame 54 may be in an expanded position due to flexible support 58 (and corresponding flexible connector 66) being in non-contracted positions. For example, due to pressure or forces applied on flexible frame 54 by milled material being received by flexible hopper 38 and/or by a frame (e.g., frame 12) supporting second conveyor 36, flexible frame 54 may shift or adjust (e.g., from the contracted position of example implementation 400) according to the properties of flexible support 58 and/or flexible connector 66. Accordingly, flexible frame 54 may have a first shape when flexible hopper 38 (or conveyor system 24 cold planer 10) is not in operation or not receiving material (e.g., as shown in example implementation 400 of FIG. 4) and a second shape, that is different from the first shape, when flexible hopper 38 (or conveyor system 24 or cold planer 10) is in operation or receiving material (e.g., as shown in example implementation 500).

In example implementation 500, flexible frame 54, when in the expanded position, may have a non-uniform shape or non-symmetrical shape that is based on a position of second conveyor 36 relative to first conveyor 34 and/or an amount of material that is being received by flexible hopper 38. Flexible frame 54 is in the expanded position when material is being received by flexible hopper 38 (e.g., material is being transferred through skirt 56). Additionally, or alternatively, flexible frame 54 may be in the expanded position when second conveyor 36 is not aligned with another conveyor (e.g., first conveyor 34), such that second conveyor 36 conveys material in a different direction than the other conveyor (e.g., relative to a configuration of conveyor system 24).

As indicated above, FIG. 5 is provided as an example. Other examples may differ from what is described in connection with FIG. 5.

Figure 6:
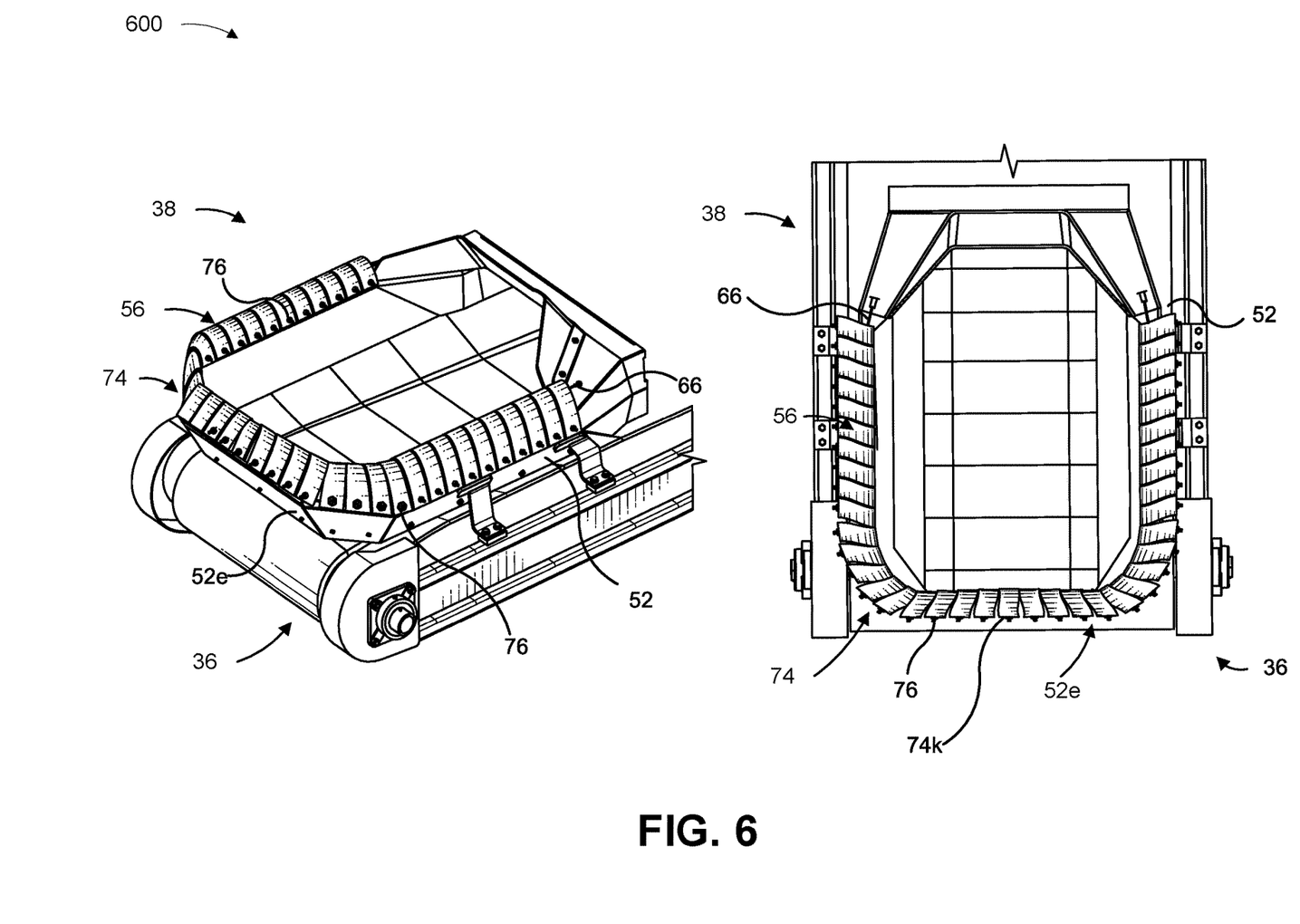
FIG. 6 is an isometric view and a top view of an example implementation of a flexible skirt for a flexible hopper described herein.

FIG. 6 is an isometric view and a top view of an example implementation 600 of skirt 56 for flexible hopper 38 described herein. As shown in FIG. 6, skirt 56 (which may be referred to herein as a "flexible skirt") is at discharge end 40 of second conveyor 36.

In FIG. 6, skirt 56 is formed from a plurality of flexible strips 74 (referred to individually as "flexible strip 74" or collectively as "flexible strips 74"). The flexible strips 74 are attached to hopper weldment 52. For example, the flexible strips 74 may be attached to hopper weldment 52 at longitudinal ends by one or more fasteners 76 (referred to individually as a "fastener 76" and collectively as "fasteners 76"). Accordingly, the flexible strips 74 may be folded such that both longitudinal ends are attached to hopper weldment 52 within a threshold distance (e.g., to cause the flexible strips 74 to form loops). The flexible strips 74 may all have substantially the same or similar shape (e.g., such that dimensions are within a tolerance (e.g., a manufacturing tolerance) and/or standard range (e.g., an industrial standard range)). Furthermore, the flexible strips 74 may all be a same type of material (e.g., rubber or other similar type of flexible material) and/or may all be formed from the same type of material. An amount of flexibility of skirt 56 may depend on a quantity of flexible strips 74 used to form skirt 56, the size of the flexible strip 74, shape of the flexible strips 74, and/or the type of material used to form the flexible strips 74.

To form skirt 56 as shown in FIG. 6, the flexible strips 74 may be folded and/or wrapped over a flexible connector 66. Flexible connector 66 may be attached to hopper weldment 52 and run from a first side of hopper weldment 52, under folds in the flexible strips 74, to a second side (that is opposite the first side) of hopper weldment 52. Flexible connector 66 may include or be an elastic tensioning member that bundles the flexible strips to form skirt 56 and enable an enclosure to be formed between flexible connector 66 and hopper weldment 52, as shown. Flexible connector 66 may be positioned at or near the opening of skirt 56 through which material is to be received. Accordingly, the size and/or shape of the opening of skirt 56 may depend on and/or correspond to the size and/or shape of flexible connector 66. In other words, as flexible connector 66 expands and contracts, the opening of skirt 56 will correspondingly expand and contract. In this way, the opening of skirt 56 (which may be the opening of flexible hopper 38) is capable of changing shape when second conveyor 36 is receiving the material.

As shown in FIG. 6, the flexible strips 74 are lined along the top of hopper weldment 52. In some implementations, the flexible strips 74 are attached to hopper weldment 52 in a manner such that adjacent flexible strips 74 overlap each other. For example, a first flexible strip may be fastened to hopper weldment 52 with a same fastener 76 that is used to attach a second flexible strip to hopper weldment 52. In such an example, that same fastener 76 may attach the first flexible strip 74 on an interior of hopper weldment 52 (the side that receives material) to the second flexible strip 74 on an exterior of hopper weldment 52. Accordingly, the flexible strips 74 in the overlapping configuration may prevent gaps from forming between pairs of adjacent flexible strips 74 and/or may only allow relatively small gaps between pairs of adjacent flexible strips 74 through which minimal material can pass. The flexible strips 74 may be configured such that a width of any gap that may form between pairs of adjacent flexible strips 74 is smaller than expected diameters of chunks of material that are to be received by second conveyor 36. In this way, skirt 56 may be formed from a plurality of flexible strips.

In FIG. 6, a keystone flexible strip 74k is centrally located relative to an end of hopper weldment 52 (referred to as "hopper weldment end 52e"). The keystone flexible strip 74k may be configured in a manner such that keystone flexible strip 74k is symmetrically attached to hopper weldment 52 relative to hopper weldment end 52e. For example, longitudinal ends of keystone flexible strip 74k may be attached to hopper weldment end 52 via a same fastener (with a first longitudinal end on the interior side of hopper weldment 52 and a second longitudinal end of keystone flexible strip 74k attached on the exterior side of hopper weldment 52). Furthermore, the other flexible strips 74 (e.g., a remaining set of flexible strips other than keystone flexible strip 74k) may be attached such that the other flexible strips 74 overlap each other and are angled (relative to an axis of symmetry of flexible strips 74) toward keystone flexible strip 74 to form skirt 56. For example, each of the remaining flexible strips 74 may be attached such that longitudinal ends of the remaining flexible strips do not align with each other (e.g., there is a lateral threshold distance between fasteners 76 that attach the longitude ends of the remaining flexible strips 34 to hopper weldment 52) and/or are angled in a direction toward an adjacent flexible strip 74.

As indicated above, FIG. 6 is provided as an example. Other examples may differ from what is described in connection with FIG. 6.

Figure 7:
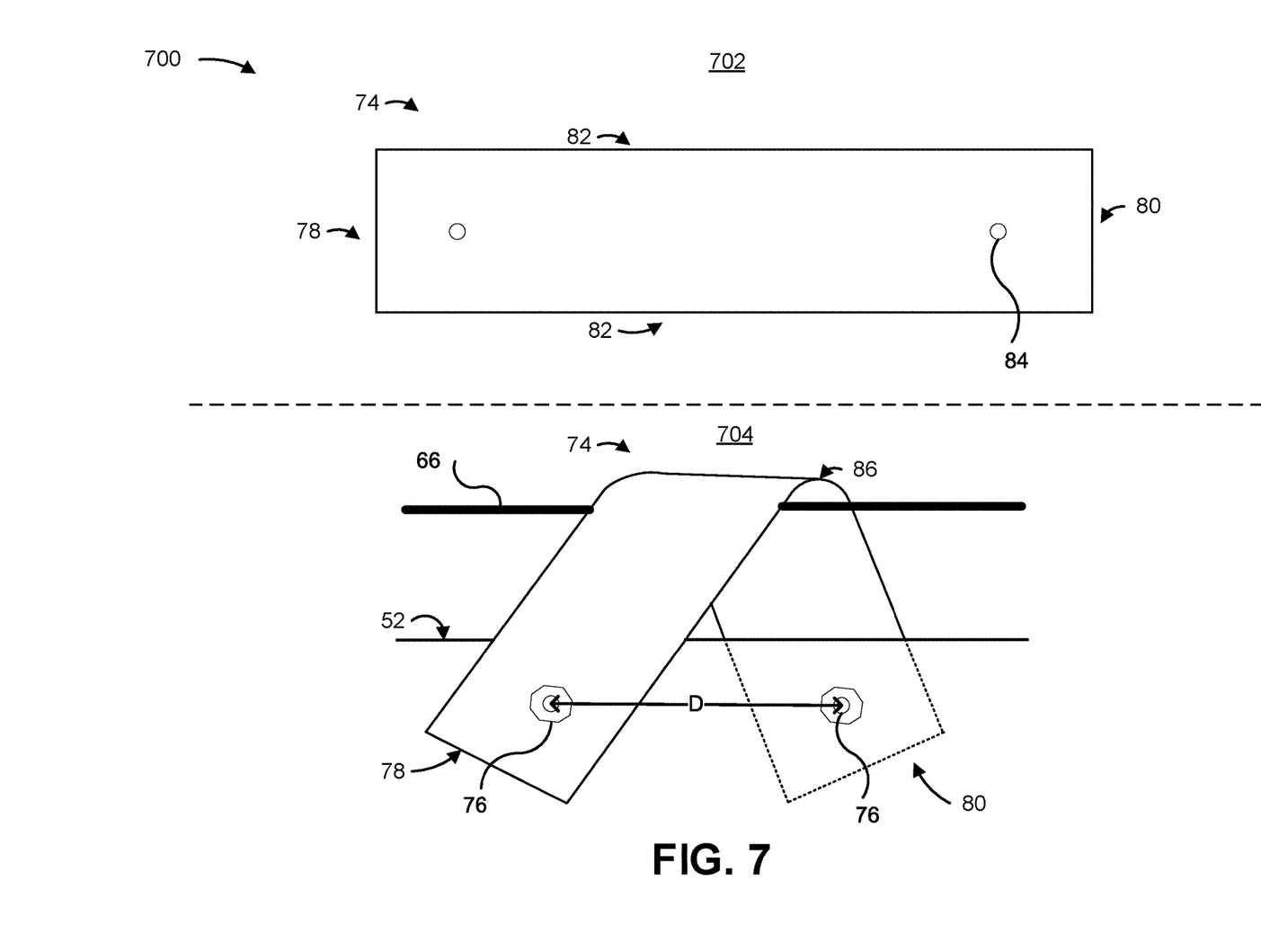
FIG. 7 is a diagram of an example implementation of a flexible strip of the flexible skirt of FIG. 6.

FIG. 7 is a diagram of an example implementation 700 of a flexible strip 74 of the flexible skirt 56 of FIG. 6. As shown in FIG. 7 and by reference number 702, flexible strip 74 may be rectangular in shape and have a first longitudinal end 78, a second longitudinal end 80, and lateral edges 82. Flexible strip 74 may have rectangular dimensions such that a width of longitudinal ends 78, 80 is less than one third of the length of lateral edges 82. For example, flexible strip 74 may be approximately 12 cm wide by 45 cm long. Flexible strip 74 may include one or more fastener slots 84 (referred to individually as a "faster slot 84" and collectively as "fastener slots 84") that may receive fasteners 76 that attach flexible strip 74 to hopper weldment 52. As shown, a first fastener slot 84 may be at first longitudinal end 78 and a second fastener slot may be at second longitudinal end 80.

As further shown in FIG. 7 and by reference number 704, flexible strip 74 may be wrapped over flexible connector 66 and attached to hopper weldment 52 via fasteners 76. Fasteners 76 may include a threaded bolt and screw combination, rivets, and/or the like. Further, first longitudinal end 78 of flexible strip 74 may be attached to hopper weldment 52 on an exterior side of hopper weldment 52, and second longitudinal end 80 may be attached to hopper weldment 52 on an interior side of hopper weldment 52 (as shown by the dotted line). In this way, flexible strip 74 may include a fold 86.

The two fasteners 76 that attach the first longitudinal end 78 and the second longitudinal end 80 of flexible strip 74 to hopper weldment 52 may be a lateral distance D from each other. In this way, when flexible strip 74 is wrapped over flexible connector 66 and attached with fasteners that are distance D apart, flexible strip 74 may be slightly angled laterally (e.g., to overlap an adjacent flexible strip (as shown in FIG. 6) that is also attached to hopper weldment 52). Therefore, first longitudinal end 78 may not be aligned with second longitudinal end 80 relative to an axis of symmetry (e.g., a side of hopper weldment 52). Such a configuration may further improve flexibility of flexible strip 74 while maintaining an overall strength and durability of an enclosure formed when flexible strip 74, as shown in FIG. 7, is attached to hopper weldment 52 along with a plurality of other flexible strips 74 (as shown in FIG. 6). The threshold distance D may be based on the size of flexible strip 74. For example, the distance D may be approximately 50% of the width of flexible strip 74, 75% of the width of flexible strip 74, and/or the like (FIG. 7 is not drawn to scale). In this way, such a configuration may cause lateral edge 80 of flexible strip 74 to overlap a lateral edge of an adjacent flexible strip.

As described herein, flexible strip 74 of FIG. 7 is one of a plurality of flexible strips 74 that can be used to form skirt 56. Accordingly, a second flexible strip may be attached to hopper weldment 52 via one of the fasteners 76 to be adjacent flexible strip 74 in FIG. 7. For example, the second flexible strip may attach to the exterior side of hopper weldment 52 via the same fastener 76 that is used to attach the second longitudinal end 80 of flexible strip 74 to the interior side of hopper weldment 52. In this way, a same fastener can be used to attach longitudinal ends of multiple flexible strips 74 to hopper weldment 52. The second flexible strip may similarly be wrapped over flexible connector 66 and attached via another fastener. Such a fastener may be threshold distance D from the fastener 76 used to attach second longitudinal end 80 to hopper weldment 52, and twice threshold distance D from the fastener 76 used to attach first longitudinal end 78 to hopper weldment 52. Accordingly, flexible strip 74 of FIG. 7 may be combined with a plurality of other flexible strips 74 to form skirt 56.

As indicated above, FIG. 7 is provided as an example. Other examples are possible and may differ from what was described in connection with FIG. 7.

INDUSTRIAL APPLICABILITY

The flexible hopper 38 may be used with conveyor system 24 where efficient transfer of material (e.g., milled material) is desired, such as during operation of a cold planer 10, a mining system, a standalone conveyor system, or the like. The disclosed flexible hopper 38 may enable conveyor system 24 to adjust a configuration and/or receive various amounts of material without allowing the material to escape first conveyor 34 and second conveyor 36 of conveyor system 24. Accordingly, flexible hopper 38 enables flexible functionality to adjust the configuration of conveyor system 24 (e.g., to adjust a position of second conveyor 36 relative to first conveyor 34), while maintaining operability of conveyor system 24 (e.g., because only minimal amounts of material can escape the conveyor system and cause a failure). For example, including flexible hopper 38 on charge end 42 of second conveyor 36 enables second conveyor 36 to pivot (e.g., about charge end 42 and/or a discharge end of first conveyor 34) relative to first conveyor 34. Having such a capability without sacrificing the desired functionality of conveyor system 24 enables cold planer 10 to discharge material (e.g., from discharge end 40 of second conveyor 36) in a variety of directions relative to a direction of travel. Accordingly, a haul truck to receive the discharged material may not necessarily need to be placed in front of cold planer 10 while under operation. For example, the haul truck can be placed to a side of cold planer 10 to receive a first load of material while another haul truck is aligned in front of cold planer 10 to receive a second load of the material. Such an operation may enable cold planer 10 to operate nearly continuously without needing to wait for another haul truck to be aligned with discharge end 40 of the second conveyor 36. Therefore, costs (e.g., fuel costs, wear and tear, or the like) associated with stopping and starting the operation of cold planer 10 are avoided, while enabling proper transfer of milled material through conveyor system 24.

Furthermore, flexible hopper 38 can prevent damage to one or more machines utilizing conveyor system 24 (e.g., cold planer 10). Flexible frame 54 and skirt 56 enable flexible hopper 38 to receive material from first conveyor 34 without letting the material escape second conveyor 36 or conveyor system 24. Such damage may occur due to the material improperly or unexpectedly escaping conveyor system 24. Such damage may occur due to the transferred material impacting parts of the one or more machines, causing mechanical failures (e.g., due to causing friction between moving parts of the one or more machines), electrical failures (e.g., due to shorting circuits or destroying electronic components), or the like. Accordingly, including flexible hopper 38 with a conveyor system 24 may lower costs of replacing equipment, maintenance, and/or repairs relative to previous conveyor systems by preventing material from escaping conveyor system 24.

Flexible hopper 38 may be configured to have a skirt 56 that is flexible using a plurality of flexible strips. For example, the flexible strips may be formed of a particular material (e.g., rubber) that has a particular rigidity that when folded and/or angled (by folding and stretching longitudinal ends apart) is strong enough that a flexible frame is not needed. In this way, materials for a frame may not necessarily be needed to form flexible hopper 38 as skirt 56 can be configured using the flexible strips and a flexible connector (e.g., an elastic tensioning member) to shape the flexible strips into an opening for flexible hopper 38. Furthermore, such a skirt may simplify assembly of flexible hopper 38.

What is claimed is:

1. A cold planer, comprising:
   a frame;
   at least one traction device configured to support the frame;
   an engine supported by the frame and configured to drive the at least one traction device to propel the cold planer;
   a milling drum;
   a first conveyor comprising a first charge end, configured to receive material removed by the milling drum, and a first discharge end;
   a second conveyor comprising a second charge end and a second discharge end; and
   a flexible hopper fixed to the second charge end of the second conveyor and configured to receive material from the first discharge end of the first conveyor,
      wherein the flexible hopper comprises:
         a flexible connector, and
         a flexible skirt that includes a plurality of flexible strips folded over the flexible connector,
            wherein at least a portion of each of the plurality of flexible strips is configured to overlap a portion of another strip of the plurality of flexible strips to form an enclosure between the first discharge end and the second discharge end.

2. The cold planer of claim 1, wherein the flexible hopper further comprises a hopper weldment,
   wherein the hopper weldment is attached to the second conveyor, and
   wherein the flexible connector and the plurality of flexible strips are attached to the hopper weldment.

3. The cold planer of claim 2, wherein a first end of the flexible skirt is attached to the hopper weldment by attaching longitudinal ends of each of the plurality of flexible strips to the hopper weldment.

4. The cold planer of claim 3, wherein the flexible connector bundles the plurality of flexible strips at a second end of the flexible skirt that is opposite the first end of the flexible skirt.

5. The cold planer of claim 2, wherein each strip of the plurality of flexible strips are attached to the hopper weldment at longitudinal ends of the one or more strips to cause the strip to be folded over the flexible connector.

6. The cold planer of claim 5, wherein the flexible connector comprises an elastic tensioning member that bundles the plurality of flexible strips together.

7. The cold planer of claim 5, wherein a set of the plurality of flexible strips are folded over the flexible connector by being wrapped around the flexible connector such that first longitudinal ends of the set of the plurality of flexible strips are not aligned with respective second longitudinal ends of the set of the plurality of flexible strips when attached to the hopper weldment.

8. The cold planer of claim 1, wherein an opening of the flexible skirt has a first shape when the cold planer is in operation and the opening of the flexible skirt has a second shape when the cold planer is not in operation.

9. A machine comprising:
   a conveyor to convey material from a charge end to a discharge end,
      wherein the material is received, from a milling drum, at the charge end; and
   a flexible hopper configured to receive material from the discharge end,
      wherein the flexible hopper comprises a flexible skirt that is bundled by a flexible connector,
         wherein the flexible skirt includes a plurality of overlapping flexible strips folded over the flexible connector.

10. The machine of claim 9, wherein the conveyor is a first conveyor, the charge end is a first charge end, and the discharge end is a first discharge end, and
   wherein the machine further comprises:
      a second conveyor to convey material from a second charge end to a second discharge end,
         wherein the flexible hopper includes a hopper weldment that surrounds the second charge end to enable an enclosure to be formed between the first discharge end and the second charge end.

11. The machine of claim 10, wherein the flexible connector includes an elastic tensioning member that is attached to the hopper weldment.

12. The machine of claim 10, wherein a first end of the flexible skirt is attached to the hopper weldment by attaching longitudinal ends of each of the plurality of overlapping flexible strips to the hopper weldment.

13. The machine of claim 10, wherein the enclosure extends from the first discharge end to the hopper weldment.

14. The machine of claim 9, wherein the plurality of overlapping flexible strips are configured to enable an opening of the flexible hopper to expand or contract based on an amount of the material received by the flexible hopper.

* * * * *